Dec. 15, 1942.   J. C. CRONKHITE   2,305,066
BATTERY CARRIER AND POST CLAMP THEREFOR
Filed Jan. 8, 1941

JUSTIN C. CRONKHITE
INVENTOR

BY Hubert J Miller
ATTORNEY

Patented Dec. 15, 1942

2,305,066

UNITED STATES PATENT OFFICE 2,305,066

BATTERY CARRIER AND POST CLAMP THEREFOR

Justin C. Cronkhite, Watonga, Okla., assignor of one-half to Ray T. Dewey, Watonga, Okla.

Application January 8, 1941, Serial No. 373,568

5 Claims. (Cl. 294—104)

This invention relates to an improvement in battery lifting and carrying devices, and more particularly to clamps which form a part of such devices, and this application is a continuation in part of my pending patent application for Battery carrier filed April 21, 1939, under Serial Number 269,284.

While the terminal posts of most storage batteries are identical in size and shape, they are made of soft metal and become worn and mis-shapen in use. As a result the ordinary commercially available battery lifter may satisfactorily handle new batteries but will seldom safely handle used batteries. The perforated rigid plates which serve as the terminal post clamps in such lifters often slip off of worn posts, drop the battery, and result in breakage or other damage. An additional disadvantage in such lifters is that it is necessary for the user to hold each perforated plate on each terminal post with his fingers while the lifting force on the handle of the carrier is applied, so that the plates will grip the respective posts. This invariably results in getting battery acid, corrosion detritus, etc., on the fingers and hands.

It is the chief object of my invention to provide a battery carrier and lifter the clamps of which will receive will receive and clamp either new or worn and mis-shapen battery terminal posts, and which will also receive and clamp oversize or undersize posts.

It is an additional object of the invention to provide a carrier which is so constructed that the individual clamps may be "set" to grip the posts without the necessity of touching the posts with the fingers or hands, thus eliminating the soiling and possible injury of these members.

Figure 1:
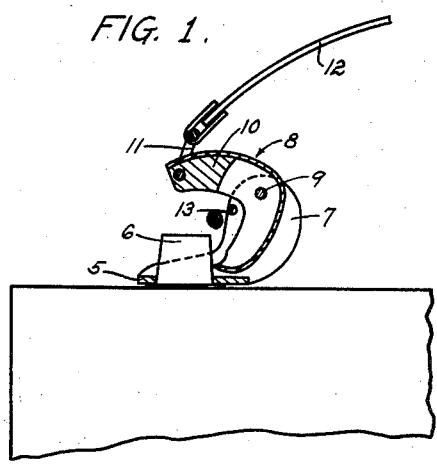
Figure 2:
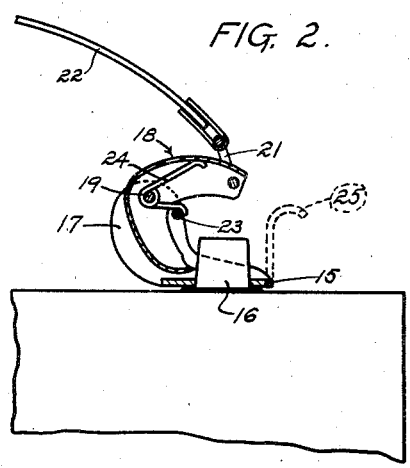
Figure 3:
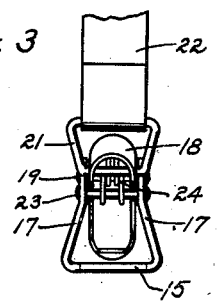

The details in the construction of two preferred forms of the invention, together with other objects attending its production, will be better understood from the following description when read in connection with the accompanying drawing, which is chosen for illustrative purposes only, and in which Figure 1 is a fragmentary side elevation of a battery carrier embodying the invention, with parts shown in vertical section, the device being illustrated in position on one post of a storage battery;

Figure 2 is a similar view showing a slightly different embodiment of the invention; and Figure 3 is an end view of the Figure 2 embodiment of the invention.

Referring to Figure 1 it will be seen that the embodiment of the invention illustrated therein includes a rigid plate 5 having a perforation therethru to receive a battery post 6. This plate 5 is provided with a pair of identical upstanding side walls 7, preferably integral with the plate, which walls reach a greater height near one end of said plate than at the other end.

At a relatively high point between said side walls 7, a post contacting jaw 8 is pivoted on a cross pin 9. This jaw 8 is in the form of a bell crank lever, and it is so positioned that when its lower end is pivoted to contact one side of a battery post protruding upward through the perforation in the plate, its upper end assumes a position above and in substantial alignment with the vertical axis of said post, as shown. The jaw 8 may be made of a single flat plate stamped into a cross sectional channel shape, as shown, or it may be cast. Its lower end is preferably dressed down or cut away to provide a relatively sharp edge for contacting and "biting" into the soft metal of the post, while its upper end is weighted by a weight 10, which may be spot welded in position. The upper end of the jaw 8 is transversely bored to pivotally receive a suitable hanger 11, to which one end of a flexible handle 12 is attached in any suitable manner.

It will be understood, of course, that one of these post clamps is similarly attached to the other end of the handle 12, and that when these two clamps are placed on the two posts of a battery, and a lifting force is applied near the middle of the handle, the lower end of the jaw of each clamp is urged by leverage toward a tighter contact with its respective post. The post is thus firmly gripped between the jaw and the remote edge of the perforation in the plate 5, and the jaw firmly prevents the battery post from slipping out of the perforation even though the post fits loosely therein.

The weight 10 serves to urge the lower end of the jaw away from a post contacting position so as to facilitate the placing of the clamp over a battery post. A transverse bar 13 is suitably positioned between the side walls 7, and serves as a stop to limit the pivotal movement of the jaw 8 in either direction.

Referring to the embodiment illustrated in Figures 2 and 3 it will be seen that the basic construction is almost identical to the construction just described. This embodiment includes a perforated rigid plate 15, having upstanding side walls 17; and a post contacting bell crank type jaw 18 pivoted between the side walls on a cross pin 19. This jaw 18 is likewise preferably channel shaped in cross section. The weight 10 is eliminated in this embodiment, but a handle 22 is attached to the upper end of the jaw 18 in any suitable manner, as by means of a hanger 21. A transverse stop bar 23, identical to the bar 13 is provided.

In this embodiment a suitable spring 24 is mounted on the pivot pin 19, one end of the spring being arranged to bear against the inside surface of the jaw 18, while the other end of the spring hooks over the stop bar 23. The spring 24, thus mounted, serves to urge the lower end of the jaw 18 into a post contacting position. In addition an upstanding rigid finger rest 25 is positioned at one end of the plate 15, as shown by the dotted lines.

To place the clamp on a battery post 16, the index finger may be placed beneath the hook at the upper end of the finger rest 25, the thumb is placed on top of the upper end of the jaw 18, and a slight squeezing pressure pivots the jaw and moves its lower end away from the perforation in the plate 15. When the jaw 18 is released, its lower end is immediately forced against the battery post by the spring 24, and the clamp is ready to lift the battery.

While I have described and illustrated only two specific embodiments of my invention, I am aware that it is capable of embodiment in other forms, and I do not wish to be limited except by the prior art and by the scope of the appended claims.

I claim:

1. A storage battery carrier clamp comprising: a rigid plate perforated near one of its ends to receive a battery post, and having integral upstanding side walls near its opposite end; and a post contacting bell crank jaw pivotally mounted between the side walls of said plate with one of its arms projecting toward the perforation in said plate for movement into and out of contact with one side of a battery post protruding upward through the perforation and with its other arm extending to a position spaced directly above said perforation, whereby when a lifting force is applied to the last mentioned arm of said jaw, the post contacting arm of the jaw is urged toward a tighter contact with the post.

2. The device described in claim 1 and, spring means for urging the lower end of said jaw toward a post contacting position.

3. The device described in claim 1 and, means limiting the maximum movement of the post contacting arm of said jaw in a post contacting direction.

4. A storage battery carrier clamp comprising: a rigid plate perforated near one of its ends to receive a battery post, and having integral upstanding side walls near its opposite end; a post contacting bell crank jaw pivoted between the side walls of said plate in such manner that when its lower end is pivoted into contact with one side of a battery post protruding upward through the perforation in said plate, its upper or opposite end assumes a position above and in substantial alignment with the vertical axis of the post, whereby when a lifting force is applied to the last mentioned end of said jaw, the post contacting end of the jaw is urged toward a tighter contact with the post; spring means for urging the lower end of said jaw toward a post contacting position; and means limiting the maximum movement of the lower end of said jaw in a post contacting direction.

5. The device described in claim 1 and, an upstanding finger hold located at the perforated end of said plate.

JUSTIN C. CRONKHITE.